United States Patent Office 2,950,554
Patented Aug. 30, 1960

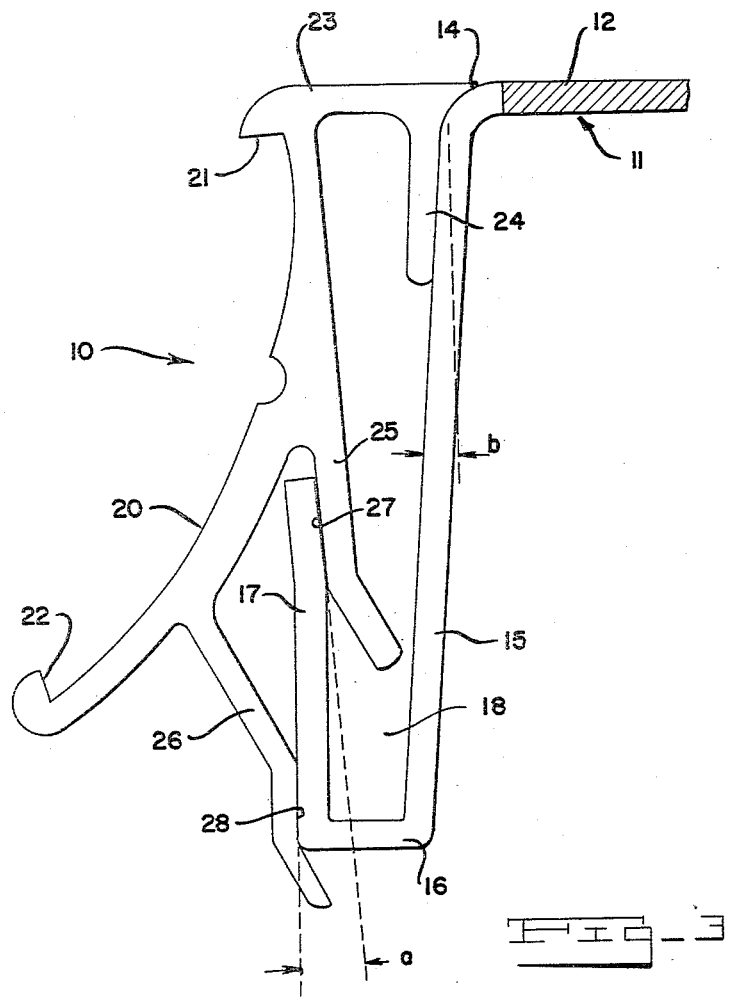

2,950,554

PRICE TAG MOLDING

Allan D. Foster, Grosse Pointe, Mich., assignor to Almor Corporation, Detroit, Mich.

Filed Oct. 29, 1959, Ser. No. 849,551

6 Claims. (Cl. 40—16)

This invention relates to a price tag molding and more particularly to a molding formed for attachment to the front edge of a shelf.

In commercial shelving, such as the type of shelving used in supermarkets or other types of stores, it is common to provide an edge molding upon shelving and particularly an edge molding formed to carry price tags. These are commonly referred to as price tag moldings.

The presently available price tag moldings are generally of a type which are permanently secured to the front edge of a shelf by welding or by screws or other mechanical fastening means. However, the disadvantage of this type of molding is that, being permanent or substantially permanent, it can not be easily removed and replaced when damaged or worn. Even if it is of the type that can be replaced, a great deal of work is required to remove the mechanical fasteners and replace them.

Temporary types of mounting means have proven unsuccessful because they do not tightly lock the shelf molding to the shelf so that the molding can easily fall off in the wear and tear of putting on and taking off of merchandise from the shelves.

Thus, it is an object of this invention to form a price tag molding of a type which is not permanently connected to the shelving but which instead is frictionally locked thereon, and which may be removed by simply tapping it with a mallet or hammer and can easily be replaced the same way, but which cannot be easily dislodged by any person tampering with it.

A further object of this invention is to form a price tag molding for a front edge of a shelf which is made in one piece such as by a simple inexpensive extrusion which may be cut to required length and may be easily replaced by a substitute piece when needed.

These and other objects and advantages of this invention will become apparent upon reading the following description of which the attached drawings form a part.

In these drawings:

Fig. 3 is a greatly enlarged view of the side of the molding and a portion of the side of the shelf.

Figure 1:
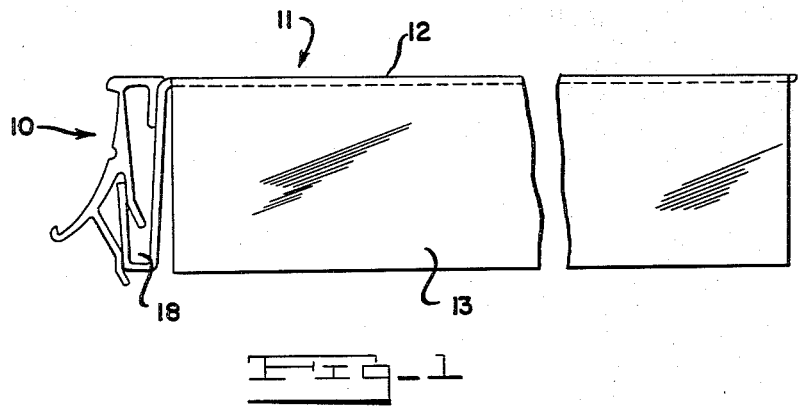
Fig. 1 is a side view of a shelf with the molding in place.
Figure 2:
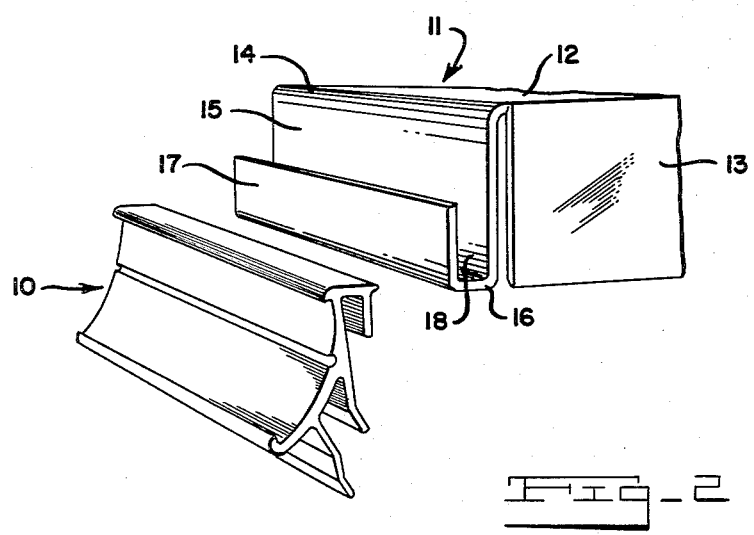
Fig. 2 is a perspective view of part of the shelf and molding shown disassembled.

The price tag molding is generally designated as 10 and the shelf is generally designated as 11. The shelf 11 is formed with a top shelf portion 12 upon which merchandise and the like may be placed and is illustrated as having side flanges 13 depending from each side.

It is formed with a front substantially horizontal edge 14 including a downwardly depending front flange 15 which forms a front channel 18 by being bent into a base 16 and an upwardly extending flange 17. Preferably the shelf is formed of a thin sheet metal material as is commonly used for shelving today. However, it may be formed of wood or other thick material and the shelf edge channel may be formed by a means which provides a forward flange 17 and a base 16.

The price tag molding is formed of an elongated strip 20 which is normally horizontally arranged and is provided with a curved front face with shoulders 21 and 22 at its upper and lower edges respectively. These shoulders contain the top and bottom edges of a price tag card which may be inserted between the shoulders and pressed inwardly to conform to the contour of the front face of the molding to thus exhibit the price shown thereon.

The means for securing the molding to the shelf include an extension 23 formed integral with the top of the strip and extending rearwardly therefrom and provided with a formation, namely a downwardly depending lip 21 shaped to fit against the top edge of the flange 15, that is the front edge of the shelf from the top of the shelf a short way towards the bottom of the channel 18. The lip and extension are formed integral with the strip.

In addition, an upper flange 25 and a lower flange 26 are formed integral with the rear face of the strip and extend downwardly from the strip at an acute angle relative thereto. The upper flange is provided with a flat face portion 27 which is formed to contact the inside of the flange or leg 17 with the flange 25 being inside the channel.

The lower flange 26 is also formed with a flat face 28 shaped to fit against the outside of the forward flange or channel leg 17 near the bottom thereof.

The two flat faces are arranged in planes which intersect each other at a slight acute angle "$a$," such as several degrees. Thus, they are not truly parallel. For example the flat face 28 could be truly vertical with the flat face 27 being non-vertical by three or four degrees. Thus, when the channel leg 17 is embraced between the two flat faces it bends somewhat and, being inherently resilient, it deforms and tightly locks against the respective flat face portions.

Preferably, the depending lip 24 is also provided with a face portion arranged at a slight angle "$b$" to the vertical as shown in the enlarged Fig. 3, so that lip formation wedges against flange 15.

As can be seen, the shelf is pre-formed with its channel 18, and the molding strip may be of an extruded one piece construction. To assemble, the molding need merely be arranged with its flange 25 partially entering into the channel and then a few sharp blows of a hammer or a mallet will drive the molding into place where it will be frictionally retained against removal. To remove the strip, a sharp blow with a mallet can pry the strip loose from the channel.

Normally, the flanges 25 and 26 and the lip 24 extend the entire length of the strip. Thus, there is a full length contact throughout the entire length of the strip between the respective flanges and lip and the shelf so that the strip is frictionally locked in place along its entire length.

This invention may be further developed within the scope of the following attached claims. Accordingly, it is desired that the foregoing description be read as being merely illustrative of an operative embodiment of this invention and not in a strictly limiting sense.

I now claim:

1. A price tag molding for use with a shelf formed of thin sheet metal and having a horizontal front edge with a downwardly depending front edge flange which is bent forwardly and then upwardly of the shelf edge to form an upwardly opening channel including a base and a forward flange, comprising an elongated, horizontally arranged strip arranged to be spaced from and in front of the shelf front edge flange and having a front face with means formed thereon to receive and hold price tags on said front face; and means for frictionally securing the molding to the shelf, said means consisting of a top extension formed on the strip and extending rearwardly a sufficient distance to bridge the top of the shelf channel and then terminating in a formation formed to seat against the shelf front edge flange at the top thereof, and a pair of flanges formed between the upper and lower edges of the strip and extending rearwardly and downwardly from the strip at an acute angle relative to the strip, one of the flanges being an upper flange spaced above the other, lower flange, and with the upper flange arranged to fit inside the shelf channel and having a front flat base portion arranged to engage against the rear, that is, inside wall of the shelf forward flange near the top thereof and the lower flange having a rear flat face portion arranged to fit against the forward, that is, outside wall of the shelf forward flange near the bottom thereof, and with the two flat face portions being at a small acute angle relative to each other whereby the shelf forward flange is caused to bend a small amount when in contact with the two face portions to thus frictionally lock the molding to the shelf.

2. A construction as defined in claim 1 and wherein said formation consists of a downwardly extending lip formed integral with said extension and arranged to form face to face contact with the shelf front edge flange from the shelf horizontal front edge downwardly a short distance towards said channel base.

3. In a shelf and molding construction comprising a shelf having a horizontal front edge and a molding consisting of an elongated, horizontally arranged strip having a front face, the strip being formed for attachment to the shelf front edge; the improvement comprising means for frictionally securing the strip to the shelf edge, said means including an upwardly opening, continuous channel formed on the shelf front edge with one leg of the channel being positioned in front of the shelf edge and being formed of a thin, somewhat resilient material, a rearwardly extending extension formed on the top of the strip and bridging the top of the channel and terminating in a formation formed to seat against the shelf front edge near the top thereof, and an upper flange and a lower flange formed integral with the rear face of the strip and extending downwardly therefrom at an acute angle thereto, the upper flange being fitted into the channel and having a flat portion in contact with the channel leg inside the channel, but near the top of the leg, the lower flange having a flat portion fitted against the channel leg outside of the channel, but near the bottom of the leg, and the two flat portions being in two planes which are close to vertical relative to each other but which intersect at a slight acute angle, whereby the channel leg is tightly wedged between the two flat portions and is slightly deformed thereby to tightly lock the strip to the shelf.

4. A construction as defined in claim 3 and wherein said flanges are continuous and extend along substantially the entire length of the strip, and wherein the channel extends the entire width of the shelf front edge, and wherein the channel leg and flanges are in contact throughout the length of the flanges.

5. A construction as defined in claim 4 and wherein said extension formation comprises a downwardly depending lip extending the length of the strip and shaped to fit against the shelf front edge from the top of the shelf front edge for a distance towards the bottom of the channel.

6. A construction as defined in claim 5 and wherein said lip is slightly less than perpendicular to the rearward extension so as to wedge against said shelf front edge.

References Cited in the file of this patent

UNITED STATES PATENTS

| | | |
|---|---|---|
| 1,247,033 | Swartz | Nov. 20, 1917 |
| 1,929,468 | Bales | Oct. 10, 1933 |
| 2,730,825 | Wilds | Jan. 17, 1956 |
| 2,895,241 | Ferdinand et al. | July 21, 1959 |